United States Patent
Ranta

(10) Patent No.: US 8,270,364 B1
(45) Date of Patent: Sep. 18, 2012

(54) METHOD, APPARATUS AND COMPUTER PROGRAM FOR WIRELESS COMMUNICATION

(75) Inventor: Jukka Tapio Ranta, Kaarina (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/418,824

(22) Filed: Mar. 13, 2012

(30) Foreign Application Priority Data

Jun. 6, 2011 (GB) .................................. 1109449.7

(51) Int. Cl.
*H04J 3/00* (2006.01)
(52) U.S. Cl. .................... 370/329; 370/280; 370/281
(58) Field of Classification Search ........... 370/310, 370/328, 329, 280, 281
See application file for complete search history.

(56) References Cited

U.S. PATENT DOCUMENTS

| | | | |
|---|---|---|---|
| 2011/0205905 A1* | 8/2011 | Kang et al. ..................... | 370/241 |
| 2011/0239076 A1* | 9/2011 | Liu et al. ....................... | 714/751 |
| 2011/0243066 A1* | 10/2011 | Nayeb Nazar et al. ....... | 370/328 |
| 2012/0134305 A1* | 5/2012 | Damnjanovic et al. ....... | 370/280 |

FOREIGN PATENT DOCUMENTS

| EP | 2 362 566 A2 | 8/2011 |
|---|---|---|
| WO | WO 2010/114252 A2 | 10/2010 |
| WO | WO 2011/026534 A1 | 3/2011 |

OTHER PUBLICATIONS

3GPP TS 36.331 V10.1.0 (2011-03), $3^{rd}$ Generation Partnership Project; Technical Specification Group Radio Access Network; Evolved Universal Terrestrial Radio Access (E0UTRA); Radio Resource Control (RRC); Protocol Specification; (Release 10), (290 pages).
IEEE 802.16e-2005, "IEEE Standard for Local and Metropolitan Area Networks—Part 16: Air Interface for Fixed and Mobile Broadband Wireless Access Systems," Feb. 28, 2006, (822 pages).

* cited by examiner

*Primary Examiner* — Hassan Kizou
*Assistant Examiner* — Siming Liu
(74) *Attorney, Agent, or Firm* — Harrington & Smith

(57) ABSTRACT

An apparatus and method for wireless communication uses carrier aggregation (LTE, HSPA) having an improved feedback operation that optimises the radio interface for the uplink direction (LTE).

20 Claims, 2 Drawing Sheets

METHOD, APPARATUS AND COMPUTER PROGRAM FOR WIRELESS COMMUNICATION

FIELD OF THE INVENTION

The present invention relates to a method, apparatus and computer program for wireless communication. The present invention has particular application to mobile communication networks. In particular embodiments, the present invention relates to the radio interface and the uplink feedback report between user equipment and the network wherein the network comprises multiple carriers.

BACKGROUND OF THE INVENTION

3GPP, the 3rd Generation Partnership Project, develops specifications for third generation mobile phone systems, and also from Release 8 (Rel-8) the next generation specifications often referred to as LTE, Long Term Evolution.

Carrier aggregation is a proposed technology for future mobile phone systems in which multiple carriers are aggregated to increase the overall performance. For example LTE and HSPA (High Speed Packet Access) can be used in a single system, enabling the peak data rates of the two systems to be added together. The transition from UTRA (UMTS Terrestrial Radio Access) to E-UTRA (evolved UMTS Terrestrial Radio Access) will be gradual comprising several evolutionary steps. One scenario comprises use of HSDPA (High Speed Downlink Packet Access) and LTE, usually referred as LTE-HSPA CA.

In one proposed arrangement, all uplink transmissions would take place in the LTE system. The HARQ (Hybrid automatic repeat request) feedback and the ACK/NACK signals for the HSDPA transmissions in the downlink are transmitted in the uplink channel resources of the LTE.

The radio frame length is 1 ms for the LTE link and configurable between 10 ms or 2 ms for the HSPA link. As a result, the overall frame lengths are different in uplink and downlink. Particularly the downlink data transmission and the uplink HARQ feedback are asymmetric. This leads to a waste of channel resources, which is illustrated in FIG. 1.

The time scale is represented at the bottom of the figure, each tick being equivalent to 1 ms. The downlink data transmission is represented in capital letters. A single data transmission unit in the HSPA link takes 2 ms and in the LTE link takes 1 ms. For each data unit there exists a corresponding uplink resource in the LTE link for HARQ feedback, wherein HARQ feedback provides the ACK/NACK information. Each acknowledgement is represented in lowercase letters. A hash sign (#) is here used to describe a NACK, requesting a retransmission. As there are four component carriers for data transmission and thus four HARQ processes, there are also four HARQ feedback symbols in each radio frame. For example, HSPA component carrier A requires retransmission, arrow 2; whereas component carrier B is acknowledged, arrow 6. As a result, the component carrier A is retransmitted in the following downlink transmission, arrow 4.

The data in HSPA is transmitted only every 2 ms, which leads to every second acknowledgement resource being empty and thus an unused resource. One solution would be repeating the feedback and increase the reliability of the HARQ feedback signaling. However, this solution would not lead to a saving of resources.

SUMMARY OF THE INVENTION

According to a first aspect of the present invention, there is provided a method of communication in a wireless communication apparatus connected to a wireless network, the method comprising: receiving one or more first downlink component carriers and one or more second downlink component carriers, the second component carrier(s) having a shorter radio frame length than the first downlink component carrier(s); rearranging the order of feedback symbols, wherein said feedback symbols correspond to the first downlink component carrier(s); and sending uplink a feedback report comprising the feedback symbols via an uplink carrier having the same frame length as the second downlink carrier(s).

Preferred embodiments of the present invention optimize the radio interface for the uplink direction from the user equipment to the network.

Examples of the first and the second downlink component carriers are HSPA and LTE. The uplink component carrier can be the same carrier as the second downlink component carrier when the LTE system uses TDD, Time Division Duplex. In the case of LTE FDD, Frequency Division Duplex, downlink and uplink are transmitted in different frequencies, therefore the uplink and downlink component carriers can share the LTE FDD system. The number of component carriers is not limited to two carriers.

In an embodiment, to the feedback report is mapped in sequential order every second of the feedback symbols corresponding to the order of the first downlink component carriers, wherein said feedback symbols form first feedback symbols. In one embodiment the remaining feedback symbols corresponding to the first downlink component carriers are mapped after the first feedback symbols in sequential order. In other words all feedback symbols corresponding to the first downlink component carrier are divided into two portions by taking every second feedback symbol into one portion. Said portions are then arranged in sequential order. If the number of the first downlink component carriers is not even, the last feedback symbol is repeated in the feedback report.

In an embodiment, the feedback report is mapped into two portions, one to the beginning and one to the end. To the beginning are mapped the feedback symbols corresponding to the first portion of downlink component carriers; and to the end are mapped the feedback symbols corresponding to the second portion of downlink component carriers. For example, in an embodiment, all HSPA carriers are mapped before all LTE carriers.

In an embodiment the wireless network comprises a wireless network element assigning an SCell index to the component carrier and the wireless communication apparatus rearranges feedback symbols in the order of SCell indexes of the corresponding component carriers. SCell index is also abbreviated as SCellIndex, relating to secondary cell index value. One example of SCell index is defined in the document 3GPP TS 36.331 version 10.1.0 Release 10.

In an embodiment, the wireless communication apparatus is configured to operate as part of a user equipment. Examples of a user equipment are a mobile phone, a mobile computing device such as PDA, a laptop computer, a USB stick, etc., i.e. any mobile device with wireless connectivity to a communication network.

According to a second aspect of the present invention, there is provided a wireless communication apparatus, the apparatus comprising at least one processor, the processor being configured to receive one or more first downlink component carriers and one or more second downlink component carriers, the second component carrier(s) comprising a shorter radio frame length than the first downlink component carrier(s); the processor being configured to rearrange the order of the feedback symbols, wherein said feedback symbols correspond to the first downlink component carrier(s); and the processor being configured to send uplink a feedback report comprising feedback symbols via an uplink carrier comprising the same frame length as the second downlink carrier(s).

In an embodiment, the apparatus is configured to map to the feedback report in sequential order every second of the feedback symbols corresponding to the order of the first downlink component carriers, wherein said feedback symbols form first feedback symbols. In an embodiment, the apparatus is configured to map to the feedback report after the first feedback symbols in sequential order the remaining feedback symbols corresponding to the first downlink component carriers. In an embodiment, the apparatus is configured to repeat the last feedback symbol in the feedback report if the number of the first downlink component carriers is not even.

In an embodiment, the apparatus is configured to map to the feedback report to the beginning of the feedback report the feedback symbols corresponding to the first portion of downlink component carriers; and to map to the end of the feedback report the feedback symbols corresponding to the second portion of downlink component carriers.

In an embodiment, the apparatus is configured to rearrange feedback symbols in the order of SCell indexes of the corresponding component carriers.

In an embodiment the apparatus is configured to operate as part of a user equipment.

According to a third aspect of the present invention, there is provided a computer program product comprising a computer-readable medium bearing computer program code embodied therein for use with a computer, the computer program code comprising instructions for causing a wireless communication apparatus to carry out a method of: receiving one or more first downlink component carriers and one or more second downlink component carriers, the second component carrier(s) having a shorter radio frame length than the first downlink component carrier(s); rearranging the order of feedback symbols, wherein said feedback symbols correspond to the first downlink component carrier(s); and sending uplink a feedback report comprising the feedback symbols via an uplink carrier having the same frame length as the second downlink carrier(s).

The preferred embodiments of the present invention improve the radio interface by freeing resources for other usage. Feedback is optimized by using the available slots in an effective manner. In specific embodiments, the HARQ feedback resources are efficiently used without unnecessarily unused symbols.

BRIEF DESCRIPTION OF THE DRAWINGS

Embodiments of the present invention will now be described by way of example with reference to the accompanying drawings, in which.

DETAILED DESCRIPTION OF THE INVENTION

Figure 2:
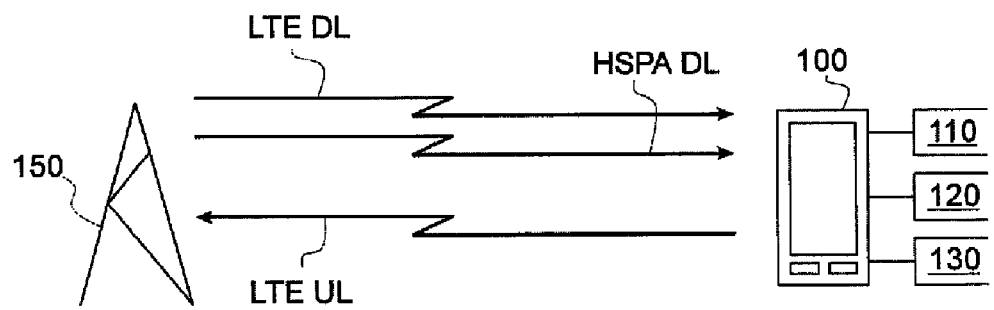
FIG. 2 shows schematically an example of user equipment and network elements and applied network technologies according to an embodiment of the present invention.

FIG. 2 shows a block diagram illustrating schematically an example of apparatus 100 according to an embodiment of the present invention connected to a mobile communication network. The apparatus 100 comprises at least one controller 110, such as a processor, a memory 120 and a communication interface 130. In one embodiment the apparatus is a computer chip but may be constituted by plural chips, a chipset, etc. Stored in the memory 120 are computer instructions which are adapted to be executed on the processor 110. The communication interface 130 is adapted to receive and send information to and from the processor 110. The apparatus 100 is commonly referred as user equipment.

A base station 150 is adapted to be part of a cellular radio access network. Suitable examples are E-UTRAN applying WCDMA technology or other similar networks suitable for high speed data transmission. Such networks are often also referred to as 4G or LTE. In this example the cellular radio access network supports carrier aggregation comprising LTE and HSPA. The base station 150 illustrated in FIG. 2 symbolizes all relevant network elements required to carry out the functionality of the wireless network.

The user equipment 100 is connected to the wireless network 150 by two carriers, LTE and HSPA. A transmission originating from the base station 150 to the user equipment 100 is called a downlink transmission, whereas the data traffic from the user equipment 100 to the base station 150 is called an uplink transmission. The downlink carriers to the user equipment are LTE DL and HSPA DL, whereas for the uplink carrier only LTE UL is used. The number of HARQ feedback resources that are needed for HSPA HARQ feedback is one half of the number of the HSPA component carriers. The result is rounded up in the case of an odd number of carriers.

Hybrid automatic repeat request, HARQ, is a combination of forward error-correcting coding and error detection using the ARQ error-control method. HARQ is used both uplink and downlink in high speed data transmission technologies such as HSDPA, HSUPA and HSPA, UMTS, the IEEE 802.16-2005 standard for mobile broadband wireless access, also known as "mobile WiMAX", and 3GPP Long Term Evolution, LTE.

Figure 1:
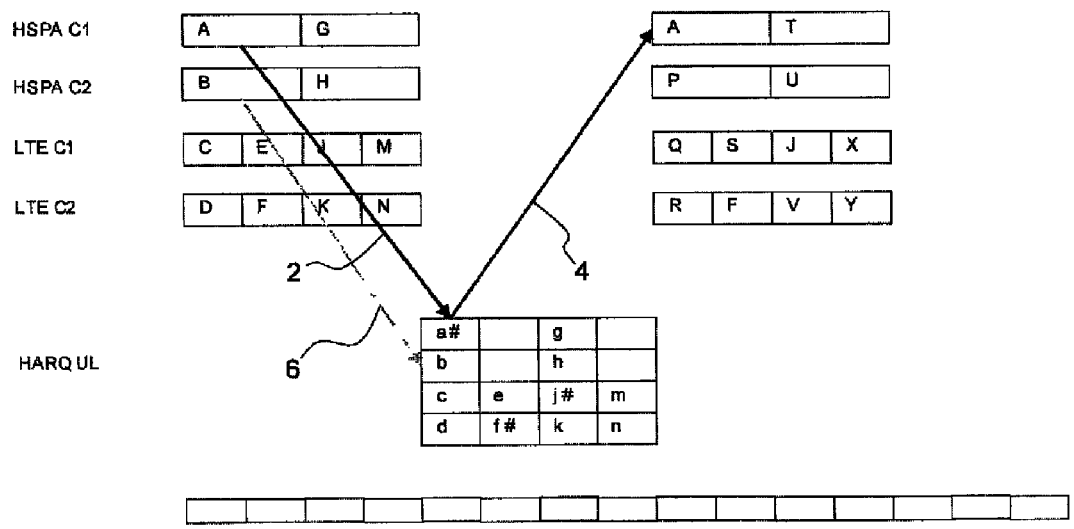
FIG. 1 shows a block diagram of an example embodiment according to prior art.
Figure 3:
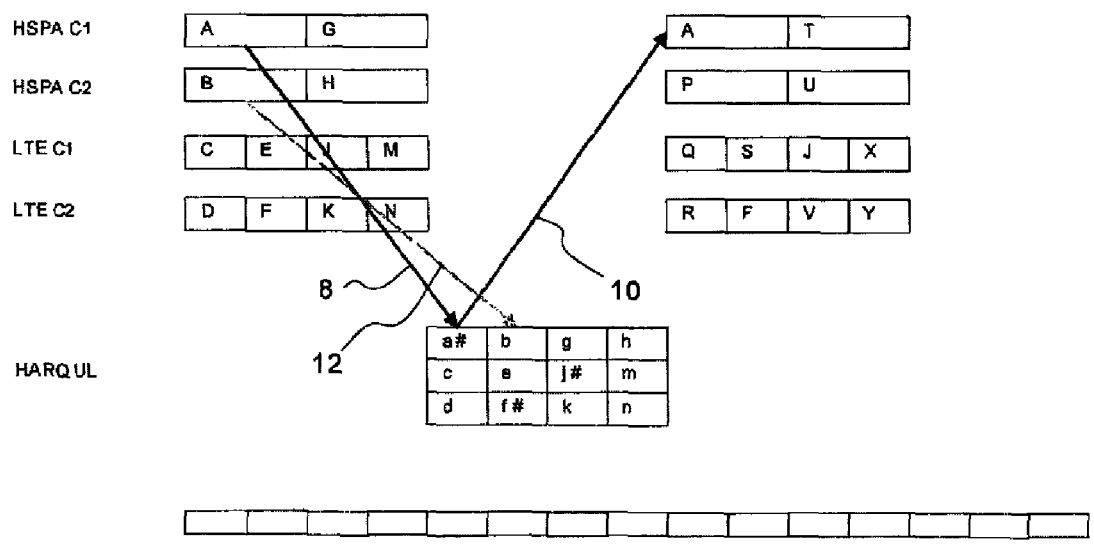
FIG. 3 shows a block diagram illustrating the functionality of an example of an embodiment of the present invention.

FIGS. 1 and 3 show schematically the framework using just two component carriers for each system, being an example of a wider set of possible configurations. The number of component carriers is not limited in either HSDPA or LTE, and may be different in HSDPA and LTE. The number of uplink HARQ resources is increased according to the number of downlink carriers. For example in FIG. 1, there is one parallel set of resources for each carrier for both systems and in FIG. 3, there is one for each LTE carrier plus a number being half the number of HSDPA carriers, rounded up in case of an odd number of HSDPA carriers.

Every second piece of resources is mapped with a 1-ms delay. This is illustrated in FIG. 3, where the same HARQ process is carried out with only three HARQ feedback symbols in each radio frame. The data A is negatively acknowledged (NACK) in the first opportunity, arrows 8 and 10; and the data B is acknowledged (ACK) 1 ms later, arrow 12. Similar functionality applies for the data G and H.

The optimization according to the preferred embodiments of the present invention is particularly effective with an even number of HSPA component carriers. If the number of carriers is odd, one of the resources may be left unused. The method is further improved by repeating the last feedback symbol.

The LTE HARQ feedback symbols are easy to allocate, because each feedback symbol has a fixed delay after the transmission of the data. This delay is 4 ms in the present LTE specifications.

Each component carrier in currently proposed carrier aggregation technology has a unique SCell index, i.e. no two carriers have the same index. In one embodiment, component carriers are organized by SCellIndex. To further simplify the mapping procedure, component carriers are organized so that all the LTE component carriers are first and the HSPA carriers follow. In one embodiment, the network allocates the component carrier indices so that all LTE carriers have lower indices than any HSPA carrier.

Rules for organizing the HARQ feedback symbols in each radio frame can be listed as follows, where the components carriers are mapped to the feedback symbols:

1. Mapping the LTE carriers to the first feedback symbols in each radio frame so that the carrier with the lowest index is mapped to the first feedback symbol and the rest of the feedback symbols in ascending order.

2. Mapping the first, third, fifth, etc. HSPA carrier to the first, second, third, etc. feedback symbol after the LTE symbols in radio frames with the same delay as the LTE feedback symbols.

3. Mapping the second, fourth, sixth, . . . HSPA carrier to the first, second, third, . . . feedback symbol after the LTE symbols in radio frames having 1 ms longer delay than the LTE feedback symbols.

4. If the number of HSPA carriers is odd, the last feedback symbol is repeated with an extra 1-ms delay.

The delay of the first HSPA HARQ feedback may be different from the LTE feedback delay. The wording of the rules above are then changed accordingly by adding an extra delay to rules 2 and 3.

Said rules cause the HARQ feedback symbols to be mapped into the feedback report. To the beginning of the feedback report are mapped the feedback symbols corresponding to the first portion of downlink component carriers; and to the end of the feedback report are mapped the feedback symbols corresponding to the second portion of downlink component carriers. As an example, for two HSDPA carriers the portion consists of all downlink component carriers. For more than two downlink component carriers, the portion may be divided into several feedback reports.

Embodiments of the present invention may be implemented in software, hardware, application logic or a combination of software, hardware and application logic. In an example embodiment, the application logic, software or instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

If desired, the different functions discussed herein may be performed in a different order and/or concurrently with each other.

Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims.

It is obvious to a person skilled in the art that with the advancement of technology, the basic idea of the invention may be implemented in various ways. The invention and its embodiments are thus not limited to the examples described above; instead they may vary within the scope of the claims.

I claim:

1. A method of communication in a wireless communication apparatus connected to a wireless network, the method comprising:
    receiving one or more first downlink component carriers and one or more second downlink component carriers, the second component carrier(s) having a shorter radio frame length than the first downlink component carrier(s);
    rearranging an order of feedback symbols, wherein said feedback symbols correspond to the first downlink component carrier(s); and
    sending uplink a feedback report comprising the feedback symbols via an uplink carrier having the same frame length as the second downlink carrier(s).

2. The method according to claim 1, comprising mapping to the feedback report every second one of the feedback symbols in a time sequential order corresponding to an order of the first downlink component carriers, wherein said feedback symbols form first feedback symbols.

3. The method according to claim 2, comprising mapping to the feedback report after the first feedback symbols the remaining feedback symbols in a time sequential order corresponding to the order of the first downlink component carriers.

4. The method according to claim 3, comprising repeating the last feedback symbol in the feedback report if the number of the first downlink component carriers is not even.

5. The method according to claim 1, comprising mapping to the beginning of the feedback report the feedback symbols corresponding to the first portion of downlink component carriers; and mapping to the end of the feedback report the feedback symbols corresponding to the second portion of downlink component carriers.

6. The method according to claim 1, wherein the wireless network comprises a wireless network element assigning an SCell index to each of the component carriers, the wireless communication apparatus rearranging feedback symbols in the order of SCell indexes of the corresponding component carriers.

7. The method according to claim 1, wherein the wireless communication apparatus is configured to operate as part of a user equipment.

8. A wireless communication apparatus, the apparatus comprising at least one processor and a memory storing computer instructions, the processor with the memory and the computer instructions being configured to receive one or more first downlink component carriers and one or more second downlink component carriers, the second component carrier(s) comprising a shorter radio frame length than the first downlink component carrier(s); the processor with the memory and the computer instructions being configured to rearrange an order of the feedback symbols, wherein said feedback symbols correspond to the first downlink component carrier(s); and the processor with the memory and the computer instructions being configured to send uplink a feedback report comprising feedback symbols via an uplink carrier comprising the same frame length as the second downlink carrier(s).

9. The apparatus according to claim 8, wherein the processor with the memory and the computer instructions is configured to map to the feedback report every second one of the feedback symbols in a time sequential order corresponding to an order of the first downlink component carriers, wherein said feedback symbols form first feedback symbols.

10. The apparatus according to claim 9, wherein the processor with the memory and the computer instructions is configured to map to the feedback report after the first feedback symbols the remaining feedback symbols in a time sequential order corresponding to the order of the first downlink component carriers.

11. The apparatus according to claim 10, wherein the processor with the memory and the computer instructions is configured to repeat the last feedback symbol in the feedback report if the number of the first downlink component carriers is not even.

12. The apparatus according to claim 8, wherein the processor with the memory and the computer instructions is configured to map to the beginning of the feedback report the feedback symbols corresponding to the first portion of downlink component carriers; and to map to the end of the feedback report the feedback symbols corresponding to the second portion of downlink component carriers.

13. The apparatus according to claim 8, wherein the processor with the memory and the computer instructions is configured to rearrange feedback symbols in the order of SCell indexes of the corresponding component carriers.

14. The apparatus according to claim 8, configured to operate as part of a user equipment.

15. A non-transitory computer-readable memory storing computer program code embodied therein for use with a computer, the computer program code comprising instructions for causing a wireless communication apparatus to carry out a method of:
receiving one or more first downlink component carriers and one or more second downlink component carriers, the second component carrier(s) having a shorter radio frame length than the first downlink component carrier(s);
rearranging an order of feedback symbols, wherein said feedback symbols correspond to the first downlink component carrier(s); and
sending uplink a feedback report comprising the feedback symbols via an uplink carrier having the same frame length as the second downlink carrier(s).

16. The computer-readable memory according to claim 15, wherein the computer program code comprises instructions for causing a wireless communication apparatus to map to the feedback report every second one of the feedback symbols in a time sequential order corresponding to an order of the first downlink component carriers, wherein said feedback symbols form first feedback symbols.

17. The computer-readable memory according to claim 16, wherein the computer program code comprises instructions for causing a wireless communication apparatus to map to the feedback report after the first feedback symbols the remaining feedback symbols in a time sequential order corresponding to the order of the first downlink component carriers.

18. The computer-readable memory according to claim 17, wherein the computer program code comprises instructions for causing a wireless communication apparatus to repeat the last feedback symbol in the feedback report if the number of the first downlink component carriers is not even.

19. The computer-readable memory according to claim 15, wherein the computer program code comprises instructions for causing a wireless communication apparatus to map to the beginning of the feedback report the feedback symbols corresponding to the first portion of downlink component carriers; and to map to the end of the feedback report the feedback symbols corresponding to the second portion of downlink component carriers.

20. The computer-readable memory according to claim 15, wherein the computer program code comprises instructions for causing a wireless communication apparatus to rearrange feedback symbols in the order of SCell indexes of the corresponding component carriers.

* * * * *